(12) United States Patent
Jun et al.

(10) Patent No.: US 6,191,760 B1
(45) Date of Patent: Feb. 20, 2001

(54) VIDEO INPUT LEVEL CONTROL CIRCUIT IN A VIDEO APPLIANCE

(75) Inventors: Il Jin Jun, Taequ; Eun A Cha, Kyoungsangbuk-do, both of (KR)

(73) Assignee: LG Electronics Inc. (KR)

( * ) Notice: Under 35 U.S.C. 154(b), the term of this patent shall be extended for 0 days.

(21) Appl. No.: 09/000,821

(22) Filed: Dec. 30, 1997

(30) Foreign Application Priority Data

Dec. 30, 1996 (KR) .............................................. P96-76827
Jul. 7, 1997 (KR) .............................................. P97-31282

(51) Int. Cl.[7] ................................ G09G 1/14; H04N 5/14
(52) U.S. Cl. .............................................. 345/20; 348/673
(58) Field of Search .................................... 345/147, 150, 345/153, 63, 67; 348/673, 679, 686, 687, 602, 603

(56) References Cited

U.S. PATENT DOCUMENTS

| 5,184,114 | * | 2/1993 | Brown .................................. 345/150 |
| 5,196,937 | * | 3/1993 | Kageyama ........................... 358/169 |
| 5,345,278 | | 9/1994 | Choi ...................................... 348/686 |
| 5,396,257 | * | 3/1995 | Someya et al. ....................... 345/20 |
| 5,410,363 | * | 4/1995 | Capen et al. ......................... 348/679 |
| 5,550,556 | | 8/1996 | Wu et al. ............................... 345/14 |
| 5,619,229 | * | 4/1997 | Kumaki ................................ 348/673 |
| 5,644,325 | * | 7/1997 | King et al. ........................... 345/147 |

\* cited by examiner

Primary Examiner—Matthew Luu
Assistant Examiner—Anthony Blackman
(74) Attorney, Agent, or Firm—Oppenheimer Wolff & Donnelly

(57) ABSTRACT

A video input level control circuit in a video display device which can improve picture quality of the video appliance by selectively controlling input levels of the video signals inputted in different manners from different-typed video cards of a PC so that the input levels may be minimal. The circuit includes a video signal output section for signal-processing an RGB video signal inputted from a computer, a processing section for detecting whether vertical and horizontal synchronous frequency signals are inputted from the computer, and generating an input level control signal, an on-screen display (OSD) section connected to the processing section and outputting an on-screen display signal, a video input level control section connected to the processing section and receiving the input level control signal, the video input level control section generating a constrast control signal according to the input level control signal of the processing section, a contrast control section connected to the video input level control section and operable to control a contrast voltage level to adjust brightness of a screen of the video display device according to the contrast control signal outputted from the video input level control section, and an amplifier connected to the contrast control section and the OSD section, and amplifying the RGB video signal inputted from the video signal output section according to an output of the contrast control section.

2 Claims, 5 Drawing Sheets

| VIDEO LEVEL MODE | VL1-OUT | VL2-OUT | DISPLAY |
|---|---|---|---|
| 0 | LOW | LOW | VIDEO LEVEL 0 |
| 1 | LOW | HIGH | VIDEO LEVEL 1 |
| 2 | HIGH | LOW | VIDEO LEVEL 2 |
| 3 | HIGH | HIGH | VIDEO LEVEL 3 |

VIDEO INPUT LEVEL CONTROL CIRCUIT IN A VIDEO APPLIANCE

FIELD OF THE INVENTION

The present invention relates to a video input level control circuit in a video appliance, more particularly to a video input level control circuit which can improve picture quality of the video appliance by selectively controlling input levels of the video signals inputted in different manners from the different-type video cards of a personal computer (PC).

BACKGROUND OF THE INVENTION

FIG. 1 shows the conventional video input level control circuit comprising a video input circuit 71 for amplifying a video signal inputted from a video card mounted on a PC 70 to a predetermined level; a video output amplifying section 73 for amplifying the video signal outputted from the video input circuit 71 to a predetermined output level, and outputting the amplified signal to a cathode ray tube (CRT) 72; and a video input level control section 74 for controlling an input level of the video signal inputted from the video output amplifying section 73 to the CRT 72.

The video output amplifying section 73 comprises a buffer transistor Q1 for buffering the video signal inputted from the video input circuit 71, and amplifying transistors Q2, Q3 for cascode-amplifying the video signal outputted from the buffer transistor Q1.

A base terminal of the amplifying transistor Q2 is connected to an emitter terminal of the buffer transistor Q1, and the emitter terminal of the amplifying transistor Q2 is connected to the collector terminal of the amplifying transistor Q3. Bias voltages Vcc1, Vcc3 are connected to the collector terminal of the transistors Q1, Q2 via resistors R1, R3. A bias voltage Vcc2 is connected to the base terminal of the amplifying transistor Q2, and CRT 72 is connected to the collector terminal of the amplifying transistor Q3. Resistors R2, R4 are connected to the emitter terminal of the transistors Q1, Q3, respectively.

The video input level control section 74 comprises a detecting transistor Q4 connected to the base terminal of the buffer transistor Q1 via resistor R5 for detecting abnormality of the video input level and switch-amplifying the detected video input level; a thermistor TH1 connected to the base terminal of the detecting transistor Q4 for detecting internal temperature of the product; a switching transistor Q5 connected to the collector terminal of the detecting transistor Q4 for controlling the emitter voltage level of the amplifying transistor Q3; and a transistor Q6 connected to the collector terminal of the switching transistor Q5 for controlling switching intervals of the switching transistor Q5.

The emitter terminal of the amplifying transistor Q3 is connected to the collector terminal of the switching transistor Q5 via the resistor R4, and the collector terminal of the transistor Q6 is connected to the collector terminal of the detecting transistor Q4. A capacitor C1 and a resistor R11 are connected in parallel to the emitter terminal of the transistor Q6. A bias voltage Vcc4 is connected to the collector terminal of the detecting transistor Q4 via a resistor R7, and the bias voltage Vcc4 is connected to the emitter terminal of the detecting transistor Q4 via a resistor R10 for setting a bias voltage level. A resistor R13 is connected to the base terminal of the transistor Q6.

The transistors Q1–Q4 and Q6 are NPN-type transistors, and the transistor Q5 is a PNP-type transistor.

The conventional video input level control circuit constituted above operates as follows.

If a video signal is inputted to the video input circuit 71 from the video card of the connected PC 70, the video input circuit 71 amplifies the inputted video signal to a predetermined level. Then, the video input circuit 71 inputs the amplified video signal to the base terminal of the buffer transistor Q1 of the video output amplifying section. Subsequently, the buffer transistor Q1 buffers the inputted video signal and inputs the buffered video signal to the base terminal of the amplifying transistor Q3. The amplifying transistor Q3 is then turned on, and the amplifying transistor Q2 is subsequently turned on. The video signal is cascode-amplified by these two transistors Q2, Q3, and inputted to the CRT 72. CRT 72 then displays an image according to the inputted video signal.

The video signal of the video input circuit 71 is also inputted to the base terminal of the detecting transistor Q4. Since the emitter standard voltage Ve of the detecting transistor Q4 is set to be bias voltage Vcc4 by the resistor R10, the base voltage Vb=0.7+Ve. Therefore, the detecting transistor Q4 is turned on only at the voltage higher than the base voltage. In other words, if the video signal input level is applied to the CRT 72 as a normal voltage level, e.g., 0.7 V, the detecting transistor Q4 is not turned on. Accordingly, neither the switching transistor Q5 nor the transistor Q6 is turned on, thereby never affecting the emitter voltage level of the amplifying transistor Q3.

However, if the video signal input level is applied to the CRT 72 at an abnormal level, e.g., high, or if an internal temperature of the product increases, the voltage level at the base terminal of the detecting transistor Q4 becomes higher than Vb=0.7+Ve. In other words, if the internal temperature of the product affecting the video input level increases, the internal resistance of the thermistor TH1 becomes greater, and consequently, the bias voltage Vcc4 at the base terminal of the detecting transistor Q4 becomes higher than Vb=0.7+Ve after passing through the thermistor TH1. In another case, if the video signal input level inputted through the video input circuit 71 is higher than the normal level, the video signal is applied to the base terminal at a voltage higher than the base voltage of the detecting transistor Q4. Accordingly, the detecting transistor Q4 is turned on since the voltage level at the base terminal becomes higher than the standard voltage level Vb=0.7+Ve. The bias voltage Vcc4 flowing to the base terminal of the switching transistor Q5 subsequently changes its flow to the detecting transistor Q4. The switching transistor Q5 is turned on as a consequence.

If the switching transistor Q5 is turned on, the collector voltage level at the switching transistor Q5 becomes higher, and the emitter voltage level at the collector terminal of the switching transistor Q5 subsequently becomes higher. As a consequence, the amplification ability of the amplifying transistors Q2, Q3 deteriorates, and the video input level applied to the CRT 72 can be automatically controlled.

If the switching transistor Q5 is turned on, the transistor Q6 is subsequently turned on, and controls operation of the detecting transistor Q4. As shown in FIG. 2A, the detecting transistor Q4 recognizes the video signal which is as high as the base voltage as a starting signal, and operates imperfectly during the interval T1, as shown in FIG. 2B. The transistor Q6 is turned on only while the capacitor C1, which is discharged through the resistor R11 having a great resistance value, is charged. While the transistor Q6 is turned on, the voltage at the emitter of the detecting transistor Q4 flows to the transistor Q6, thereby lowering the voltage level of the emitter of the detecting transistor Q4. Therefore, the detecting transistor Q4 operates only while the transistor Q6 is turned on. Thus, the turning-on interval of the detecting transistor Q4 is determined by the interval of the capacitor C1. The interval of the capacitor C1 is short as shown to be T1 in FIG. 2C. Accordingly, the video output level inputted to the CRT 72 rapidly becomes lower, and brightness of the screen can be controlled to be minimal.

The conventional video input level control circuit constituted above is thermally stable and can compensate the varied portion if the video input level becomes higher than a predetermined level. If the video input level becomes lower than the standard input level due to different types of video cards of the PC 70, the varied portion cannot be compensated, thereby excessively saturating the video signal and deteriorating quality of the screen.

SUMMARY OF THE INVENTION

In order to resolve the above problem, an object of the present invention is therefore to provide a video input level control circuit in a video appliance which can notably improve quality of the screen of the video appliance by selectively controlling the video signal input level, which is inputted in different manners according to the different types of video cards of a PC, to be minimal.

Another object of the present invention is to provide a video input level control circuit in a video appliance which can automatically control video input level without a separate manipulation by the user by detecting an excessive input of the video signals of red (R), green (G) and blue (B) colors which are inputted in different manners from the PC, and adjusting the video signal input level and displaying an image on a monitor screen.

To achieve the above objects, the present invention provides a video input level control circuit in a video display device including a video signal output section for signal-processing an RGB video signal inputted from a computer, the circuit comprising a processing section for detecting whether vertical and horizontal synchronous frequency signals are inputted from the computer, and generating an input level control signal, an on-screen display (OSD) section connected to the processing section and outputting an on-screen display signal, a video input level control section connected to the processing section and receiving the input level control signal, the video input level control section generating a contrast control signal according to the input level control signal of the processing section, a contrast control section connected to the video input level control section and operable to control a contrast voltage level to adjust brightness of a screen of the video display device according to the contrast control signal outputted from the video input level control section, and an amplifier connected to the contrast control section and the OSD section, and amplifying the RGB video signal inputted from the video signal output section according to an output of the contrast control section.

BRIEF DESCRIPTION OF THE DRAWINGS

Other objects and advantages of the present invention will become more apparent with reference to the preferred embodiments accompanying the drawings, in which.

DETAILED DESCRIPTION OF THE PREFERRED EMBODIMENTS

Figure 1:
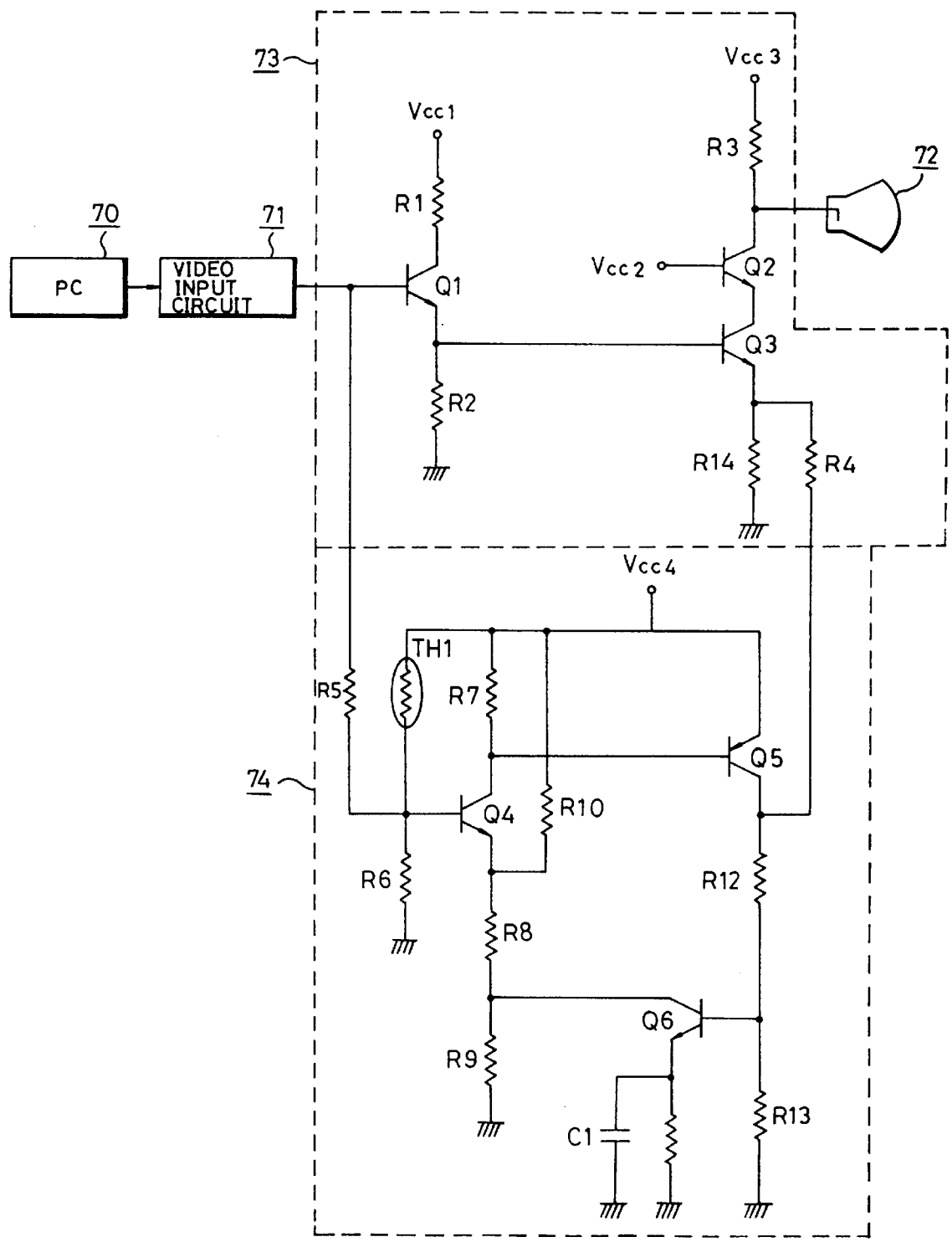
FIG. 1 is a block diagram illustrating the conventional video input level control circuit.
Figure 2A:
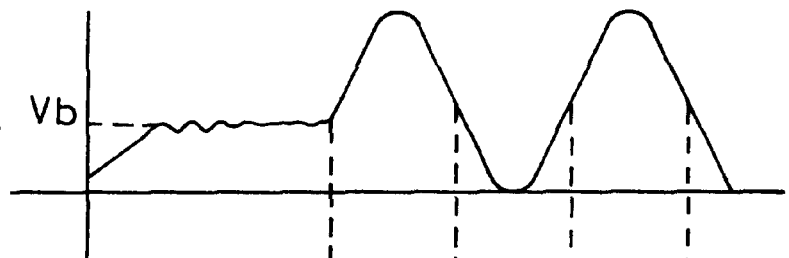
FIGS. 2A to 2C are waveform diagrams illustrating waveforms of the detecting transistor of the circuit in FIG. 1.
Figure 2B:
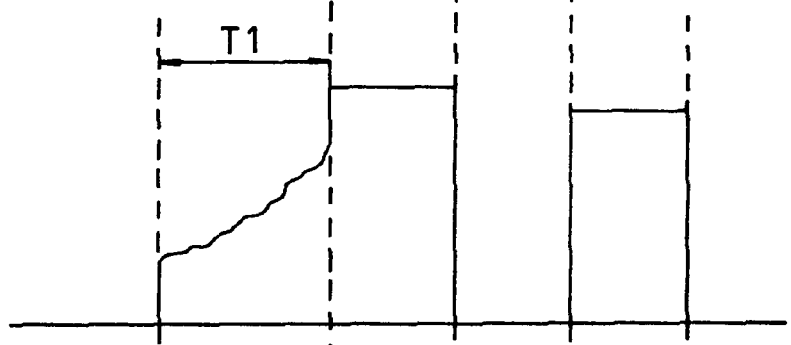
Figure 2C:
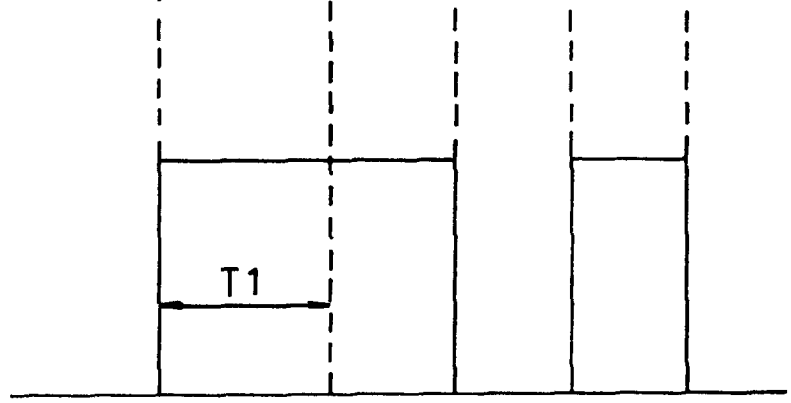
Figure 3:
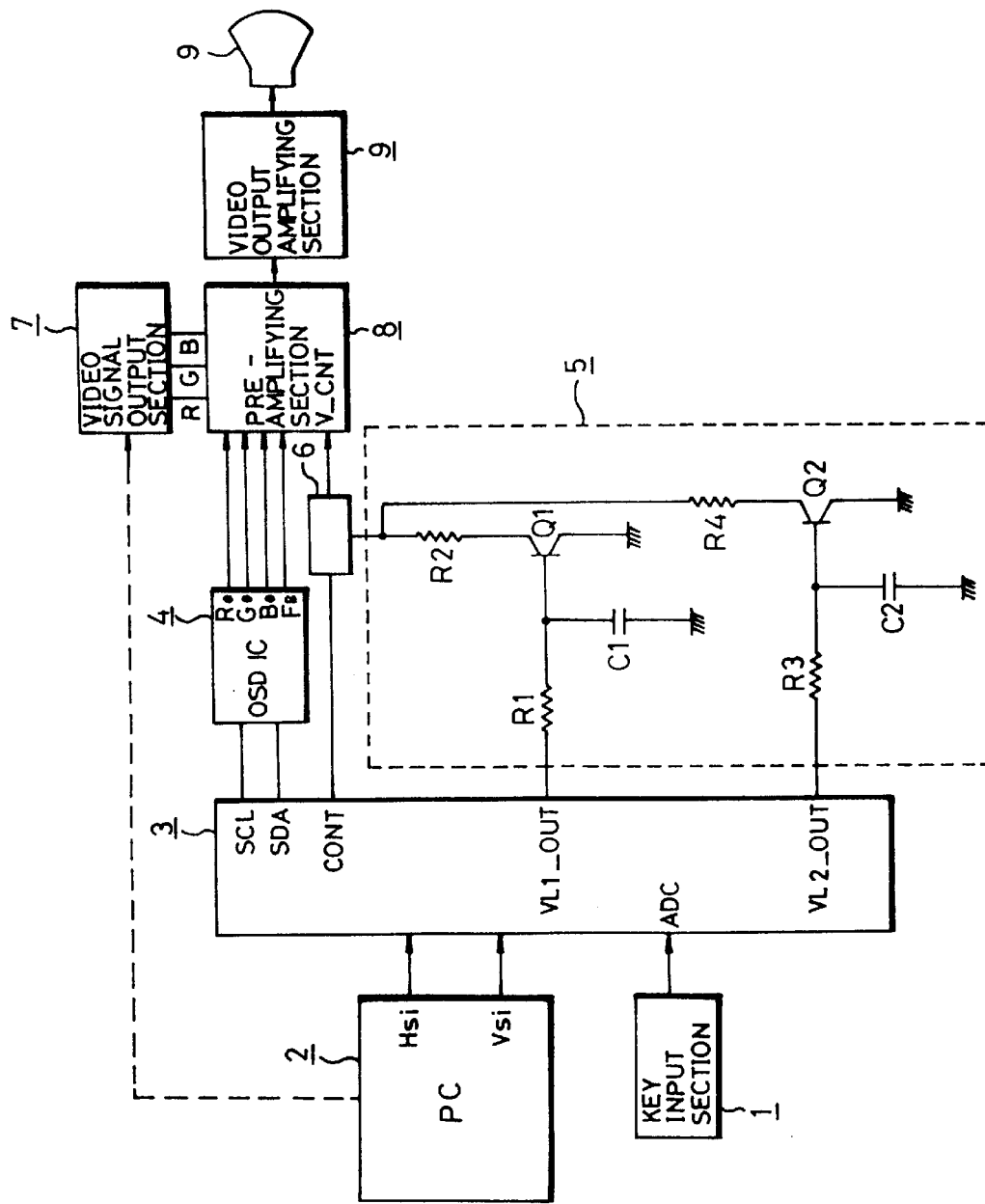
FIG. 3 is a block diagram illustrating a circuit according to an embodiment of the present invention.

FIG. 3 is a block diagram illustrating a circuit according to an embodiment of the present invention.

Referring to FIG. 3, the present invention comprises a key input section 1 for setting operational functions of the monitor system including a video signal input level selection function; a processing section 3 for controlling the operational functions of the monitor system according to the function setting signal of the key input section 1, and recognizing the frequency currently inputted by the vertical and horizontal inputs Hsi, Vsi inputted from the PC 2; an OSD IC 4 for outputting a signal controlling the video input level selection menu screen according to the signal controlling the video input level selection menu inputted through the terminals of serial clock (SCL) and serial data (SDA) of the processing section 3; a video input level control section 5 for controlling a video signal input level according to the logic control signals inputted from video level control terminals VL1, VL2 of the processing section 3; a contrast control section 6 for controlling the contrast voltage level according to the video input level control signal of the video input level control section 5 to control brightness of the screen of the monitor (not illustrated in the drawing); a video signal output section 7 for R, G, B signal-processing the video signals inputted from the PC 2; a pre-amplifying section 8 for amplifying the R, G, B color video signals inputted from the video signal output section 7 by a predetermined amplification factor according to the contrast control signal outputted from the contrast control section 6; and a video output amplifying section 10 for output-amplifying the color video signals inputted from the pre-amplifying section 8, and displaying the amplified color video signals on a CRT 9.

The video input level control section 5 is connected to a transistor Q1, which is connected to a VL1-out terminal of the processing section 3 via a resistor R1 for outputting a logic signal, and a transistor Q2, which is connected to a VL2-out terminal of the processing section 3 via a resistor R3 for outputting a logic signal. The contrast control section 6 is connected to each collector terminal of the transistors Q1, Q2 via resistors R2, R4. A capacitor C1 is connected between a base terminal of the transistor Q1 and the resistor R1, and a capacitor C2 is connected between a base terminal of the transistor Q2 and the resistor R3.

Figure 4:
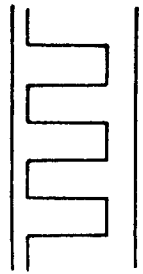
FIG. 4 is an operational mode table illustrating an operational mode of the circuit in FIG. 3.

Operation of the present invention according to the embodiment constituted above will now be explained with reference to FIGS. 3 and 4.

If a video signal is inputted to the video signal output section 7 from a video card of the PC 2, and if vertical and horizontal synchronous frequency signals are inputted to the processing section 3 simultaneously, the video signal output section 7 R, G, B signal-processes the video signal inputted from the video card, and inputs the signal-processed video signal to the pre-amplifying section 8. At this stage, the processing section 3 detects whether the horizontal and vertical synchronous frequency signals Hsi, Vsi are inputted from the PC 2. The processing section 3 simultaneously detects whether a function setting signal which sets a video input level selection function is inputted from the key input section 1 through an analog digital converter (ADC).

If the signal which sets a video input level selection function has been inputted from the key input section 1, the processing section 3 inputs the signal controlling the video input level section menu to the OSC IC 4 via SDA and SCL. The OSD IC 4 inputs the signal controlling the video input level selection menu screen to the pre-amplifying section 8 through output terminals Ro, Go, Bo, Fb according to the signal controlling video input level selection menu. The pre-amplifying section 8 intercepts the video signal inputted from the video signal output section 7 according to the inputted control signal of the OSD IC 4, and inputs the video input level selection menu screen signal only after amplifying the same. The video output amplifying section 10 amplifies the inputted video input level selection menu screen signal to a predetermined output level, and displays the signal on the CRT 9.

The user then sets the video input level through the key input section 1 by referring to the video input level selection menu screen of the CRT 9. If the user has set "VL MODE= 0" through the key input section 1 as shown in FIG. 4, the processing section 3 applies a signal 'low' to the video input level control section 5 via VL1-out and VL2-out terminals. The transistors Q1, Q2 or the video input level control section 5 are subsequently turned off, and the contrast control section 6 inputs the video level as outputted from a CONT terminal of the processing section 3 to a V_CNT terminal of the pre-amplifying section 8. The pre-amplifying section 8 amplifies the video signal to be the video input level as inputted to the V_CNT terminal to the video output amplifying section 10.

Meanwhile, if the user has set "VL MODE=1" on the video input level selection menu screen, the processing section 3 outputs a signal 'low' through the VL1-out terminal, and a signal 'high' through the VL2-out terminal to the transistors Q1, Q2, respectively, of the video input level control section 5. The transistor Q1 of the video input level control section 5 is subsequently turned off, while the transistor Q2 is turned on. Thus, the output voltage of the contrast control section 6 is lowered as much video level as "VL MODE=1" by the resistor R4, and then inputted to the pre-amplifying section 8.

If the user has set "VL MODE=2" on the video input level selection menu screen, the processing section 3 outputs a signal 'high' through the VL1-out terminal, and a signal 'low' to the VL2-out terminal to the transistors Q1, Q2, respectively. The transistor Q1 of the video input level control section is subsequently turned on, while the transistor Q2 is turned off. Therefore, the output voltage of the contrast control section 6 is lowered as much video level as "VL MODE=2" by the resistor R2, and then inputted to the pre-amplifying section 8.

If the user has set "VL MODE=3" on the video input level selection menu screen, the processing section 3 outputs signals 'high' only through VL1-out and VL2-out terminals to the transistors Q1, Q2, respectively, of the video input level control section 5. Subsequently, both the transistors Q1, Q2 of the video input level control section 5 are turned on, and the transistors Q1, Q2 input the voltage outputted from the contrast control section 6 to the pre-amplifying section 8 after lowering the voltage as much amount as divided through the resistors R4 and R2.

In other words, the contrast control section 6 adds or reduces the contrast control output voltage to the pre-amplifying section 8 according to the video input level control signal of the video input level control section 5. Then, the pre-amplifying section 8 amplifies the video signal with brightness of the screen being controlled, and inputs the amplified video signal to the video output amplifying section 10. The video output amplifying section 10 subsequently amplifies the inputted video signal by a predetermined amplification factor, and displays the amplified video signal on the CRT 9.

Since the input level of the video signal can be selectively controlled, excessive saturation of video color signals or change of brightness of the monitor screen generated due to different types of video cards of the PC 2 can be improved.

Figure 5:
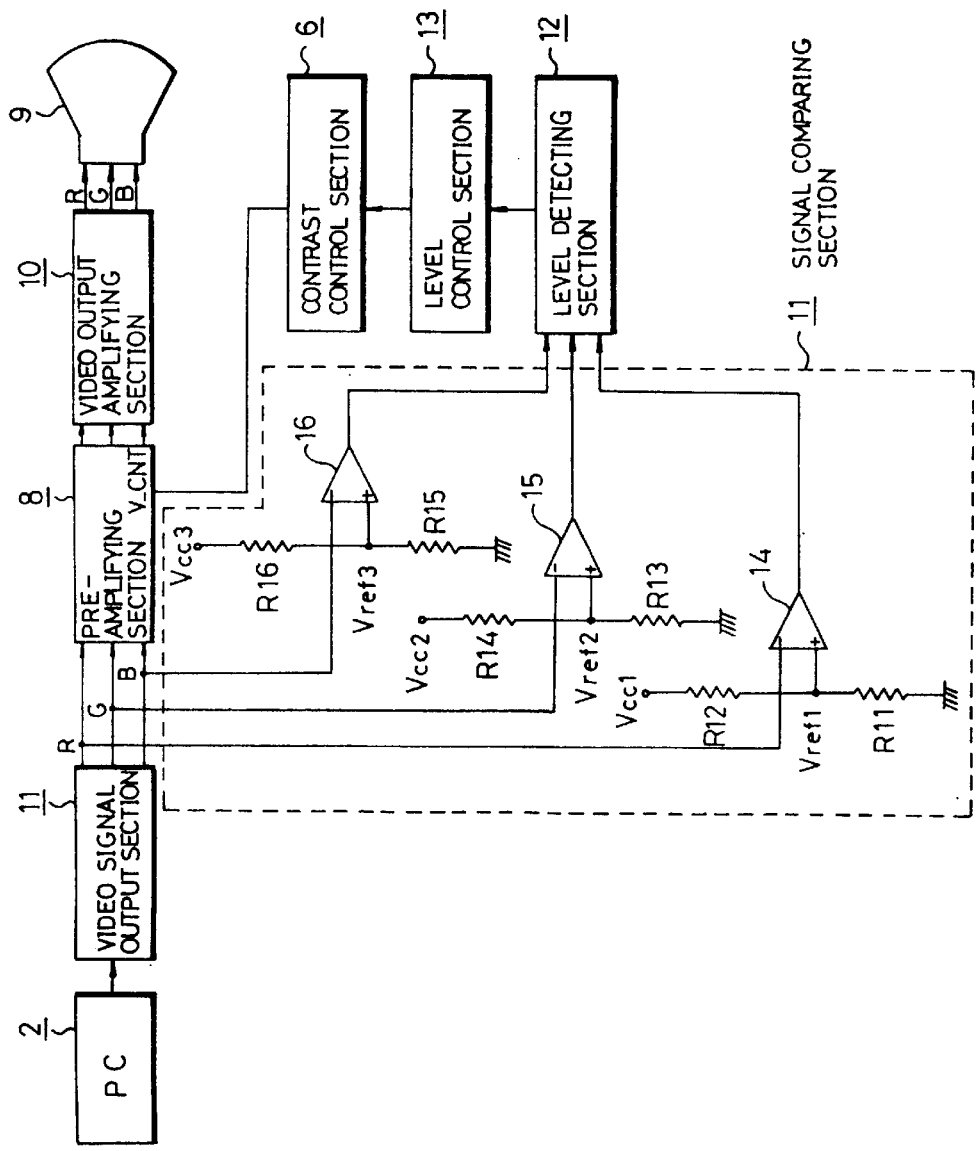
FIG. 5 is a block diagram illustrating a circuit according to another embodiment of the present invention.

FIG. 5 shows an automatic video input level control circuit according to another embodiment of the present invention.

Referring to FIG. 5, the present invention comprises a video signal output section 7 for R, G, B signal-processing the video signal inputted from the PC 2; a pre-amplifying section 8 for amplifying the color video signals inputted form the video signal output section 7 by a predetermined amplification factor; a video output amplifying section 10 for output-amplifying the color video signal inputted to the pre-amplifying section 8, and displaying the amplified video signal on the CRT 9; a contrast control section 6 connected to the V_CNT terminal for controlling the contrast voltage level to control brightness of the screen of the monitor (not illustrated in the drawing); a signal comparing section 11 for each of the R, G, B color video signals outputted from the video signal output section 7 with preset standard voltages, and outputting the compared signals; a level detecting section 12 for detecting excessive saturation of the video signals by means of the compared signals outputted from the signal comparing section 11; and a level control section 13 for controlling the contrast control section 8 according to the input gain level of the R, G, B color video signals detected by the level detecting section 12 to control the input levels of the video signals.

The signal comparing section 11 comprises a first comparator 14 connected to the R color video output terminal of the video signal output section 7 for comparatively outputting the R video color signal according to a standard voltage Vref 1; a second comparator 15 connected to the G color video output terminal of the video signal output section 7 for comparatively outputting the G color video signal according to a standard voltage Vref 2; and a third comparator 16 connected to the B color video output terminal of the video signal output section 7 for comparatively outputting the B color video signal according to a standard voltage Vref 3.

The standard voltage Vref 1 divided by the resistors R11 and R12 is connected to the non-inverting terminal of the first comparator 14, and the standard voltage Vref 2 divided by the resistors R13 and R14 is connected to the non-inverting terminal of the third comparator 16. Bias voltages Vcc1, Vcc2, Vcc3 are connected to the other terminals of the resistors R12, R14, R16, respectively.

The present invention according to the above embodiment operates as follows.

If a video signal is inputted to the video signal output section 7 from a video card of the PC 2, the video signal output section 7R, G, B signal-processes the inputted video signal, and inputs the signal-processed video signal to the pre-amplifying section 8.

The R, G, B color signals of the video signal output section 7 are inputted to the comparators 14, 15, 16, respectively, of the signal comparing section 11. In other words, the R color video signal of the video signal output section 7 is inputted to the inverting terminal of the first comparator 14. The first comparator subsequently compares the inputted R color video signal with the standard voltage Vref 1 divided by the resistors R11 and R12. If the inputted R color video signal is compared to be lower than the standard voltage Vref 1 as a result of comparison by the first comparator 14, a signal 'high' is outputted. If compared to be higher than the standard voltage Vref 1, a signal 'low' is inputted to the level detecting section 12.

Simultaneously, the G color video signal of the video signal output section 7 is inputted to the inverting terminal of the second comparator 15. The second comparator 15 subsequently compares the inputted G color video signal with the standard voltage Vref 2 divided by the resistors R13 and R14. If the inputted G color video signal is lower than the standard voltage Vref 2 as a result of comparison by the second comparator 15, a signal 'high' is outputted. If higher than the standard voltage Vref 2, a signal 'low' is inputted to the level detecting section 12.

Simultaneously, the B color video signal of the video signal output section 7 is inputted to the inverting terminal of the third comparator 16, and the third comparator 16 compares the inputted B color video signal with the standard voltage Vref 3 divided by the resistors R15 and R16. If the inputted B color video signal is proved to be lower than the standard voltage Vref 3 as a result of comparison by the third comparator 16, a signal 'high' is outputted. If the inputted B color video signal is proved to be higher than the standard voltage Vref 3, a signal 'low' is inputted to the level detecting section 12.

Figures 6A, 6B, 6C:
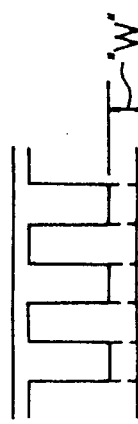
FIGS. 6A to 6C are waveform diagrams illustrating input gain control waveforms applied to the circuit in FIG. 5.

Thus, the level detecting section 12 detects logic signals according to the input level of the R, G, B video signals inputted from the first to the third comparators 14, 15, 16, and detects whether the video input level currently outputted to the CRT 9 is excessively saturated. If the level detecting section 12 detects that the video signals outputted by the first to the third comparators 14, 15, 16 are all 'high', this means that the video signal input level is inputted in normal state. Therefore, a waveform illustrated in FIG. 6C, which does not require a gain control, is inputted to the contrast control section 6. If the level detecting section 12 detects that any video signal(s) outputted by the first to the third comparators 14, 15, 16 is (are) 'low', this means that the video signal input level is excessive as illustrated in FIG. 8A. Then, the level detecting section 12 inputs the detected video signal to be adjusted according to the control signal detected by the level detecting section 12, i.e., an input gain level adjustment control signal of the waveforms of the brightness and excessive saturation, to the contrast control section 6. Then, the contrast control section 6 automatically varies and adjusts the contrast voltage level set at the pre-amplifying section 8 according to the input gain level adjustment control signal inputted through V_CNT terminal of the pre-amplifying section 8. The pre-amplifying section 8 subsequently R, G, B signal-amplifies the video signal, the contrast voltage level of which has been adjusted, as illustrated in FIG. 6B, and displays the amplified signals on the CRT 9 through the video output amplifying section 10.

According to the preferred embodiments of the present invention as described above, picture quality of a video appliance can be notably improved by selectively controlling the video signal input levels inputted in different manners according to the different types of video cards in a PC to be optimum input levels. The present invention therefore enables an automatic control of the video input levels without a separate manipulation by the user through comparators which can produce excessive saturation of the R,G, B color video signals inputted in different manners from the PC and adjust the video signal input gain level as a result of detection to display a resultant image on a monitor screen.

What is claimed is:

1. A video input level control circuit in a video display device including a video signal output section for signal-processing an RGB video signal inputted from a computer, the circuit comprising:

a processing section for detecting whether vertical and horizontal synchronous frequency signals are inputted from the Computer, and generating an input level control signal;

an on-screen display (OSD) section connected to the processing section and outputting an on-screen display signal;

a video input level control section connected to the processing section and receiving the input level control signal, the video input level control section generating a contrast control signal according to the input level control signal of the processing section;

a contrast control section connected to the video input level control section and operable to control a contrast voltage level to adjust brightness of a screen of the video display device according to the contrast control signal outputted from the video input level control section; and an amplifier connected to the contrast control section and the OSD section and amplifying the RGB video signal inputted from the video signal output section according to an output of the contrast control section;

wherein the processing section generates the input level control signal through first and second output terminals, and the video input level control section includes first and second transistors respectively connected to the first and second output terminals for outputting logic signals, the collector terminals of the transistors being connected to the contrast control section.

2. A video input level control circuit in a video display device including an amplifying section for amplifying RGB video signals containing red green and blue signals and being inputted from a video signal output section, the circuit comprising:

a contrast control section connected to an input of the amplifier for controlling the contrast voltage level to adjust brightness of a screen of the video display device;

a signal comparing section for comparing each of the RGB video signals outputted from the video signal output section with preset standard voltages, and outputting the compared signals;

a level detecting section for detecting excessive saturation of the RGB video signals based on the compared signals outputted from the signal comparing section; and a level control section having an input connected to the level detecting section and an output connected to the contrast control section, the level control section controlling the contrast control section according to an input gain level of the RGB video signals detected by the level detecting section.

* * * * *